Aug. 14, 1962 W. H. INGERSOLL 3,049,193
ROTARY WORK POSITIONING AND INDEXING TABLE
Filed May 21, 1959
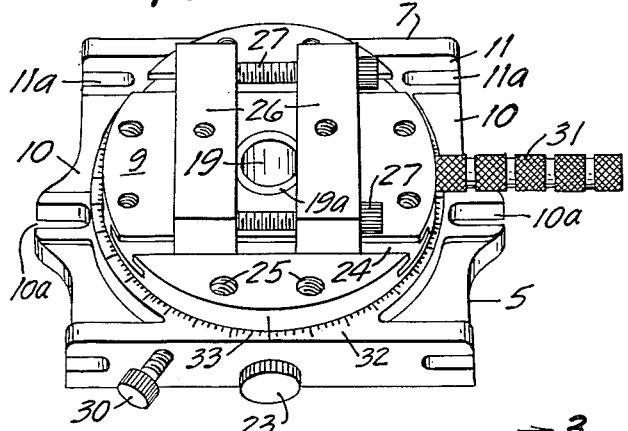
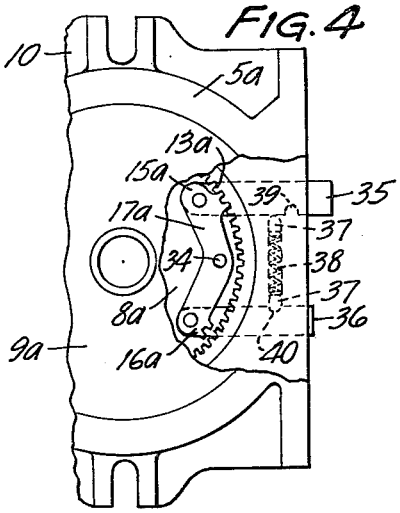
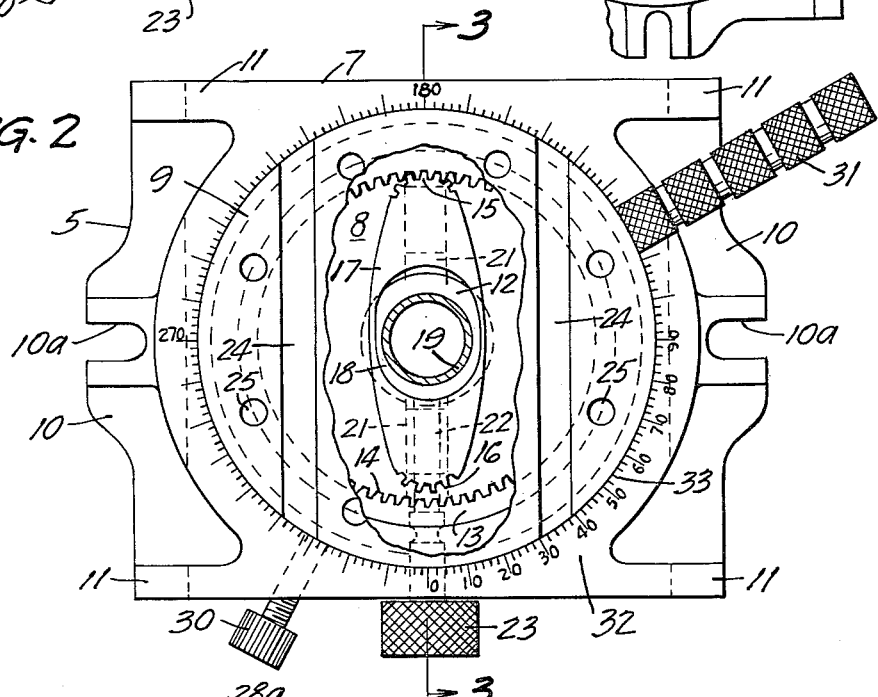
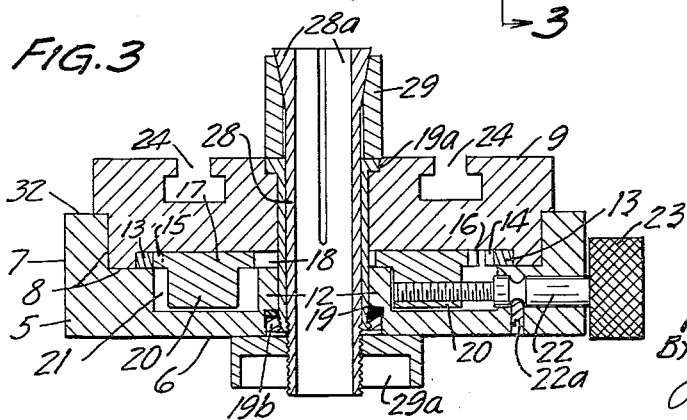
INVENTOR
WARD H. INGERSOLL
By John E. Stryker
ATTORNEY

United States Patent Office 3,049,193
Patented Aug. 14, 1962

3,049,193
ROTARY WORK POSITIONING AND INDEXING TABLE
Ward H. Ingersoll, 2444 Beverly Road, St. Paul, Minn.
Filed May 21, 1959, Ser. No. 814,733
4 Claims. (Cl. 188—69)

This invention relates to work positioning and indexing tables for holding the work in desired operating positions in relation to boring, cutting or other machine tools, and particularly to improved means for positively locking the rotary table in any of a multiplicity of predetermined angular positions on a bed or base.

It is an object of my invention to simplify and reduce the cost of rotary tables of the class described by providing indexing means comprising a complete ring gear having teeth of equal pitch, defining an elementary pitch angle, and a plurality of pawls adapted to severally interlock with the gear teeth at positions differing one from another by a fraction of such pitch angle whereby the number of positions in which the table may be locked is at least twice the number of teeth on the ring gear.

Other objects of the invention are to provide novel actuating means for the pawls of indexing mechanism of the class described whereby they may be selectively moved to and from their operative, interlocking positions in relation to the ring gear quickly and easily, with the table in any of the multiplicity of predetermined positions.

The invention also includes certain other novel features of construction which will be hereinafter more fully pointed out and defined in the appended claims.

Referring to the accompanying drawing which illustrates, by way of example and not for the purpose of limitation, preferred and modified forms of the invention:

FIGURE 1 is a perspective view showing my improved table and base with a work holder of one of several suitable types mounted on the front face of the table;

FIG. 2 is a plan view of the table and base with portions of the table broken away to show the ring gear and pawls;

FIG. 3 is a vertical sectional view taken on the line 3—3 of FIG. 2 and showing another type of work holder in place in the central bearing, and FIG. 4 is a fragmentary plan view showing a modified form of the pawls and actuating means therefor, with a portion of the table broken away to show parts that would otherwise be concealed.

In the drawing my improved indexing table has a base indicated generally by the numeral 5, preferably formed with a plane machined back face 6 and a plane side face 7 extending perpendicularly to the face 6. The base 5 is formed with a generally cylindrical chamber 8 extending in from the front face to receive a generally cylindrical table indicated by the numeral 9. Mounting flanges 10 and 11 are formed on the base 5 by which it may be mounted either in horizontal or vertical position, these flanges being formed with elongated slots 10a and 11a respectively to receive mounting bolts in conventional manner. Integral with the base 5 is a central boss 12 which projects into the chamber 8 coaxially with the peripheral surface of the chamber 8.

The table 9 is revolubly mounted in the annular bearing formed by the cylindrical wall of the chamber 8. Fixed on the table 9 concentrically with the wall of chamber 8 is a ring gear 13 having teeth 14 of equal pitch providing locking points spaced equally around the periphery of the table 9. To afford teeth of adequate strength on tables of the smaller sizes ranging from 2 to 4 inches in diameter, the ring gear 13 may be provided with 180 gear teeth, for example.

As shown in FIGS. 2 and 3, I provide within the chamber 8 a first pawl 15 having teeth adapted to interlock with the teeth of the ring gear 13 at one side of the chamber and a second pawl 16 having teeth adapted to interlock with the teeth of the gear 13 at the opposite side of the chamber. The pawl 15 is shown in its table locking position and the pawl 16 in the table release position. An important feature of these pawls is their relative positions along the circumference of the pitch circle whereby one of them is adapted to interlock with the ring gear in positions which differ from the interlocking positions of the other pawl by one-half of the pitch angle of the ring gear teeth. Thus when the pawls are in the positions shown, it is necessary to disengage pawl 15 from the ring gear and then turn the table 9 through an angle of at least one-half the pitch angle, or an integral multiple of one-half of the pitch angle, in order to align and engage the teeth of pawl 16 with the ring gear teeth.

The pawls 15 and 16 are preferably formed on end portions of a rigid bar 17 having a central opening 18 to receive a hollow central bushing 19 which extends axially through an opening in the table and base. An annular flange 19a is formed on the upper end of the bushing 19 for confining the table 9 on the base 5 and a threaded lower end portion of the bushing 19 is fitted with a nut 19b which abuts against a lock washer engaging the base 5 in a recess in the lower side thereof. The pawl supporting bar 17 is guided for straight line movement radially of the ring gear 13 by a pair of downwardly projecting lugs 20 fixed on the bar 17 and slidably fitting in guideways 21 formed in the base 5.

Means for actuating the pawls 15 and 16 to and from their interlocking positions in relation to the ring gear 13 may comprise a screw indicated generally by the numeral 22 having a threaded connection with one of the lugs 20. This screw extends to the exterior of the base 5 where it is fitted with a knurled, manually operable knob 23. Longitudinal movement of the screw 22 relative to the base is prevented by a detent 22a extending into an annular groove in a shank portion of the screw.

Various types of work holding devices may be secured to the table 9. The attachment of such devices is facilitated by providing a pair of spaced parallel guide slots 24 adapted to receive the heads of bolts and a series of tapped holes 25 extending into the face of the table. As shown in FIG. 1, some types of work pieces may be clamped between a pair of jaws 26 which are operatively connected by clamp screws 27 and guided for movement transversely of the table by members engaging the table in the guide slots 24. Another type of work holding device is shown in FIG. 3 wherein collet 28 is formed with jaws 28a which are movable longitudinally in an internally tapered collar 29. To actuate the jaws 28a a knob 29a is threaded on an end of the collet 28 which projects at the back face 6 of the base 5. This collet is readily removable when other types of work holding devices are to be used on the table 9.

Additional securing means for the angular position of the table 9 relative to the base 5 may comprise a set screw 30 extending radially of the table 9 and having a threaded connection with the base 5. The inner end of this set screw is adapted to impinge against the periphery of the table 9 when the screw is tightened. Projecting from the periphery of the table 9 at one side is a handle 31 which facilitates the turning of the table to any selected position relative to the base. A front face 32 of the base 5 is visibly graduated, preferably from 0 to 360 degrees to provide a scale 33. A similar scale may be provided on the exposed periphery of the table 9 or the latter may be provided with an index or zero mark adjacent to the scale 33 for use in accurately setting the table relative to the base.

To release the table 9 for rotation to any desired angular position the knob 23 is merely turned in the appropriate direction to withdraw both of the pawls 15 and 16 from engagement with the ring gear 13. Then, by use of the handle 31 or otherwise, the table is rotated to the required position by reference to the index or zero mark and the visual scale 33. Thereupon the knob 23 is turned to the left or right depending on whether the teeth on pawl 15 or on pawl 16 have been radially aligned with the teeth of ring gear 13. As hereinbefore pointed out the locking position of one of these pawls is one-half of the pitch angle removed circumferentially from the locking position of the other pawl. As the teeth of either pawl are moved to the table locking position they automatically turn the table to a precisely predetermined position by wedge action, the flanks of the teeth on both pawls and ring gear being precision ground to fit in the interlocking positions.

FIG. 4 shows an alternate form of table locking means comprising a first pawl 15a and a second pawl 16a mounted on an oscillating support 17a. The latter is connected by a pivot pin 34 to the base 5a within a chamber 8a similar to the chamber 8. Rotary table 9a of FIG. 4 is similar to the table 9 and is provided with a ring gear 13a similar to the ring gear 13 and fixed in coaxial relation to the table 9a and chamber 8a. The pawls 15a and 16a, like the pawls 15 and 16, are severally disposed to interlock with teeth of the ring gear 13a at positions differing one from another by one-half of the pitch angle of the ring gear. Thus the number of positions in which the table 9a may be locked by operation of the pawls is equal to twice the number of teeth on the ring gear.

Actuating means for the pawl support 17a may comprise plunger members 35 and 36 extending in parallel relation one to the other in suitable bearings formed in the base 5a. Plunger members 35 and 36 project at one side of the base 5a and are pivotally connected to the pawls 15a and 16a respectively. Suitable latch means for retaining the plunger members 35 and 36 in selected positions may comprise a pair of detents 37 which are biased by a coiled spring 38 toward recesses 39 and 40 formed in the plunger members 35 and 36 respectively. In the drawing the pawl 15a is shown in interlocking engagement with teeth of the ring gear 13a so that the table is held in a fixed position. Sufficient friction is created by the detent 37 engaging plunger member 36 in recess 40 to prevent unintentional unlocking of the indexing mechanism. When the table is to be released for free rotary movement, plunger member 35 is pushed in to a point where the teeth of pawl 35a are free of the ring gear teeth and the teeth of pawl 16a are also in the unlocked position. To lock the pawl 16a in mesh with the teeth of the ring gear 13a, it is necessary to rotate the table through an angle equal to one-half of the pitch of the ring gear teeth or a multiple of half the pitch angle. Assuming that there are 360 teeth on the ring gear, it will be evident that by selective use of the pawls 15a and 16a the table may be locked in any of 720 different, selected and predetermined angular positions.

By increasing the number of pawls mounted in cooperative relation to a single ring gear, the number of predetermined table locking points may be increased by integral multiples of the number of teeth on the ring gear corresponding to the number of pawls which are positioned around the ring gear according to the present invention.

My improved indexing means have a number of advantages over conventional tables having comparable precision locking and positioning means. These include greatly reduced cost, light weight, simplicity of operation, unusual accuracy in reproduction of all angular positions of the table, and great reduction of the degree of skill required for accurate settings. By providing pawls which severally engage the teeth of the ring gear by wedge action, inaccuracies in settings are minimized.

I claim:

1. For an indexing table of the type having a hollow base defining an annular chamber and a rotary table supported on said base and projecting into said chamber for carrying a work holder, improved indexing means comprising an internal ring gear fixed on said table coaxially to the axis of rotation thereof within said chamber and having a multiplicity of teeth of equal pitch defining a pitch angle, a member movably supported on said base within said chamber and held from circumferential movement with respect thereto, said member including a first pawl formed with a tooth disposed to interlock with teeth of said ring gear in a number of different positions corresponding to the number of teeth on said ring gear in one position of said member, said member also including a second pawl formed with a tooth disposed to interlock with teeth of said ring gear in positions differing from the locking positions of the first pawl by one-half of said pitch angle in another position of said member, said member being movable between said positions, and means extending to the exterior of said base for selectively actuating said member to lock said table in any of said angular positions and for releasing the table for rotation relative to the base.

2. Improved indexing means according to claim 1 in which said pawls comprise teeth formed on opposite ends respectively of said member and said member is supported for movement diametrically of said ring gear to alternately interlock with teeth of said ring gear at diametrically opposite sides thereof.

3. Improved indexing means according to claim 2 in which said means for selectively actuating said pawls comprise a screw extending to the exterior of the base and means operatively connecting said screw to said rigid supporting member.

4. For an indexing table of the type having a hollow base defining an annular chamber and a rotary table supported on said base and extending into said chamber, an indexing means comprising an internal ring gear secured to the underside of said table within said chamber, said ring gear having a multiplicity of teeth of equal pitch defining a pitch angle, a rigid member within said chamber and extending diametrically thereof, means on said base slidably supporting said rigid member for movement diametrically of said chamber, a gear tooth on one end of said rigid member disposed to interlock with teeth of said ring gear in a number of different positions corresponding to the number of teeth on said ring gear in one position of said member, a gear tooth on the other end of said rigid member disposed to interlock with teeth of said ring gear in positions differing from the locking positions of the first gear tooth by one half of said pitch angle in another position of said rigid member, said gear teeth on said rigid member being free of engagement with the ring gear teeth in a position intermediate said one position and other position, and means extending to the exterior of said base for moving said rigid member between said one position and said other position.

References Cited in the file of this patent

UNITED STATES PATENTS

| 1,566,405 | Jones | Dec. 22, 1925 |
| 2,557,837 | Opel | June 19, 1951 |
| 2,627,945 | Hooker | Feb. 10, 1953 |
| 2,825,426 | Baxter | Mar. 4, 1958 |

FOREIGN PATENTS

| 43,109 | Germany | Oct. 16, 1887 |